United States Patent
Hütter et al.

(10) Patent No.: US 7,020,889 B1
(45) Date of Patent: *Mar. 28, 2006

(54) METHOD FOR CALLING UP INFORMATION ABOUT CURRENT RADIO AND TELEVISION PROGRAMMES

(75) Inventors: Ingo Hütter, Celle (DE); Dirk Adolph, Ronnenberg (DE); Jens Spille, Hemmingen (DE); Sigrun Otte-Spille, Hemmingen (DE)

(73) Assignee: Thomson Licensing S.A., Boulogne-Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/613,424

(22) Filed: Mar. 11, 1996

(30) Foreign Application Priority Data

Mar. 15, 1995 (DE) ......................... 195 09 383

(51) Int. Cl.
  *H04N 5/445* (2006.01)

(52) U.S. Cl. .......................................... 725/38; 348/564
(58) Field of Classification Search .................. 348/7, 348/12, 13, 6, 8, 9, 10, 11, 553, 554, 563, 348/564, 565, 566, 906, 734; 455/4.2, 5.1, 455/6.1, 6.2, 6.3; 345/327; 725/38; H04N 7/16, H04N 7/173, 5/445
  See application file for complete search history.

(56) References Cited

U.S. PATENT DOCUMENTS 4,706,121 A * 11/1987 Young ........................ 348/906
5,517,254 A * 5/1996 Monta et al. ............... 348/906
5,557,338 A * 9/1996 Maze et al. ................. 348/906

(Continued)

FOREIGN PATENT DOCUMENTS

| DE | 3527939 A1 | 8/1985 |
| DE | 3928175 | 7/1990 |
| DE | 4113918 A1 | 4/1991 |

(Continued)

OTHER PUBLICATIONS

Translation into English of the German reference DE4113918A previously cited in our IDS of Nov. 11, 1999.
Copy of the European Search report citing the above–listed references: AL and AM.

(Continued)

*Primary Examiner*—Chris Grant
*Assistant Examiner*—Andrew Y. Koenig
(74) *Attorney, Agent, or Firm*—Joseph S. Tripoli; Joseph J. Laks; Robert D. Shedd

(57) ABSTRACT

A method for calling up information about current radio and television programs wherein desired signals are transmitted together or separately with decodable additional information signals. The method includes the steps of selecting from the additional information signals that information which is directly or indirectly linked to time information. The selected information is compared with a time period which can be predetermined and within which the current time and/or the time assigned to the current program occurs. The information corresponding to this time period is then displayed on a display device of a receiving device which receives the desired signals and additional information signals. The information is displayed in response to depressing a call up key of an associated receiving device or remote controller one or more times, such that at least two fields selected from the group consisting of start time, stop time, title, and remaining run time are displayed on a portion of the display device, while another portion of the display device displays information associated with the desired signals of a current channel which the receiving device is tuned to.

12 Claims, 1 Drawing Sheet

U.S. PATENT DOCUMENTS

| | | | | |
|---|---|---|---|---|
| 5,619,274 A | * | 4/1997 | Roop et al. | 348/6 |
| 5,621,456 A | * | 4/1997 | Florin et al. | 348/12 |
| 5,629,733 A | * | 5/1997 | Youman et al. | 348/13 |
| 5,654,748 A | * | 8/1997 | Matthews, III | 348/564 |
| 5,659,368 A | | 8/1997 | Landis | 348/467 |
| 5,710,601 A | * | 1/1998 | Marshall et al. | 348/564 |

FOREIGN PATENT DOCUMENTS

| | | |
|---|---|---|
| DE | 4113918 | 11/1992 |
| DE | 41139918 A1 | 11/1992 |
| DE | 4201031 | 7/1993 |
| EP | 0447968 | 9/1991 |
| WO | 8903085 | 4/1989 |

OTHER PUBLICATIONS

Television Data System for Program Indentification by David Broberg, NAB 1992 Broadcast Engineering Conference Proceedings, pp. 31–34.

Eitz, G., u.a.: Die nachste Stufe. In: Funkschau, Mar. 1988 S.46–49.

Eitz, G., Oberlies, K.–U.: Videotext programmiert Videoheimgerate (VPV). In: Rundfunktech Mitteilungen, Jq.30, 1986, H.5, 1986,S.223–229.

Eitz, G., Oberlies, K.U.: Schritt in die Zukunft. In: Funkschau Jul. 1989, S.62–65.

* cited by examiner

METHOD FOR CALLING UP INFORMATION ABOUT CURRENT RADIO AND TELEVISION PROGRAMMES

BACKGROUND OF THE INVENTION

In the case of the majority of programmes which can be received via cable and satellite, it is tedious for a radio listener or television viewer to obtain programme information about the programme running at the moment by searching through the channels for a programme which appears to be interesting to him or her. If he or she wishes to know, for example, the title, start time, remaining time or end time of the present programme, then, to do this, he or she would either have to study programme magazines or go through and read a number of teletext pages page by page, the page numbers of which pages can vary from one broadcasting authority to another. When looking at teletext pages, the television picture of a present programme is normally not visible and would have to be merged with the teletext by operating a further key on the remote controller in order to allow the programme to be followed in parallel with the teletext. However, this makes it harder to read the teletext pages.

BRIEF SUMMARY OF THE INVENTION

The invention is based on the object of making it possible to call up more easily and deliberately information about current radio or television programmes.

DETAILED DESCRIPTION OF THE INVENTION

Figure 1:
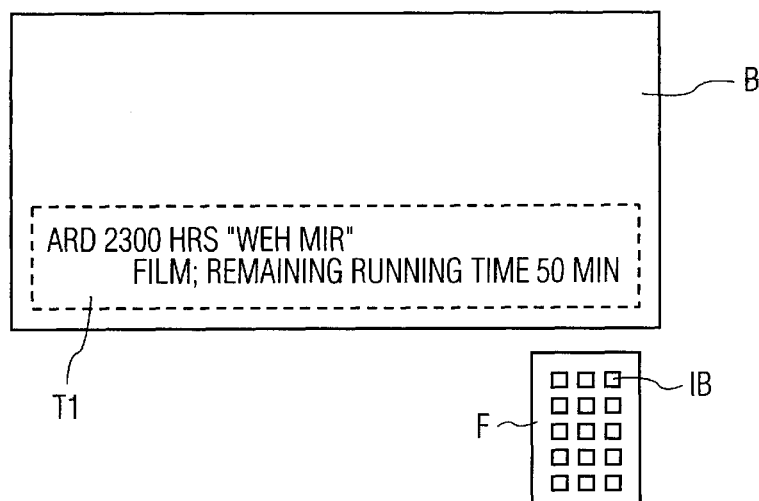
FIG. 1 is a first example of a screen listing programming information in accordance with an exemplary embodiment of the present invention.
Figure 2:
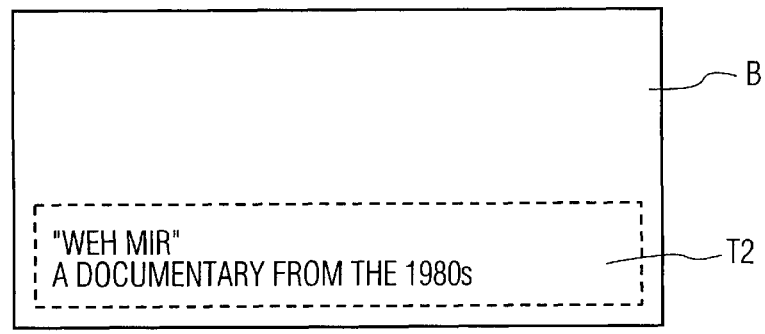
FIG. 2 is a second example of a screen listing programming information in accordance with an exemplary embodiment of the present invention.
Figure 3:
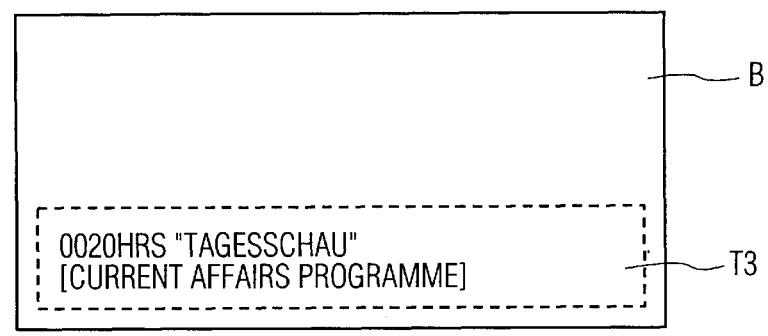
FIG. 3 is a third example of a screen listing programming information in accordance with an exemplary embodiment of the present invention.

Currently, the teletext and VPS signals in the case of television signals, and RDS signals in the case of radio signals are possible sources of additional information signals. Specific pages in the teletext signals contain the start times and the titles of the programmes as well as the VPS times, where these differ from the actual times. The title and time information about a programme are directly linked to one another by the identical pages. Furthermore, teletext also contains indirectly linked information if other pages are addressed as well as the title, which contain additional information about the programme.

The current time can either be determined from a clock within the set or, in the case of television signals, from the current time transmitted with the teletext signal. A current programme can also be assigned times other than the current time, for example by the VPS signal by means of which the present programme is assigned a specific clock time irrespective of the time at which the programme actually takes place.

By means of the measures according to the invention, it is possible to filter out and display from the range of information contained in the additional information signals that information which relates to the current programme and/or following programmes.

Similar additional information, as is already transmitted in the case of television programmes, is also transmitted in the case of radio programmes or can be implemented by coding bits of the additional information signals which are still unallocated. The same situation also applies to additional information, as is transmitted or can be transmitted in digital radio (DAB or DSS).

In this way, it is possible for the radio listener or television viewer to call up the current information about a present programme or a following programme in a simple manner by operating a key which is provided specifically for such information without, for example in the case of television programmes, having to go through and read teletext tables. The operation has been made so simple that even unskilled users can obtain this information without studying the operating instructions for the appropriate device.

If the predetermined time period is defined such that it is bounded by that time information in the additional information signals which is directly adjacent to the current time and/or to the time which is assigned to a current programme, then all the information about the present programme can be filtered out from the overall information, and can be displayed, unambiguously.

In the case of another alternative, in which the predetermined time period is bounded on the one hand by that time information which occurs immediately before the current time or by the time which is assigned to a current programme, and on the other hand by those two time information items which occur immediately after the current time, information about a following broadcast can also be displayed completely, as well as the information about the current programme.

Finally, a third alternative provides that the time period is bounded on the one hand by that time information which occurs immediately before the current time or by the time which is assigned to a current programme, and on the other hand by a fixed time interval after the current time.

In this way, in addition to the information about the current programme, information about programmes which start within the fixed time interval can also be displayed. This can be advantageous if there are a number of short programme sections before a relatively long programme section in the current broadcast. Specifically, the relatively long programme section would not be displayed in the case of the alternative mentioned above.

The information is preferably displayed in such a manner that at least the start time, the title of the programme and the remaining running time are displayed after a first key operation. A programme description relating to the present programme can be displayed after a second key operation which takes place within a predetermined time interval after the first key operation. Finally, the start time and the title of the following programme or programmes can be displayed after a third key operation which takes place within a predetermined time interval after the second key operation.

In this way is possible to keep the scope of the respectively displayed information as small as possible in order, for example, to be able to continue to watch the present programme without it being excessively adversely affected when the display is produced on a television screen, or to manage with simple display elements when the display is produced on the display of a remote controller or of the receiving device. The timing of the successive key operations is expedient in order to manage with a single key and, for example, after the predetermined time has elapsed and the key is operated again, to be able to display the first information again.

A development provides that the additional information signals of all the receivable or programmed broadcasting authorities are called up successively and this information is displayed as a table on the display device by further operation of the same call-up key, or by operating a further call-up key one or more times.

The radio listener or television viewer is then given the information about the currently running programmes at a glance and can then deliberately select the programme which interests him or her. He or she thus does not need to switch over from one programme to the other and to call up separately in each case the current information about the present programme there.

If the receiving device has only a receiving section, then the information about the receivable or programmed broadcasting authorities can be called up and continuously updated in the standby mode, so that this information is immediately available when switching the receiving device from the standby mode to the operating mode. However, during operation, this information would have to be scanned separately by interrupting the programme currently being received. In this case, the listener or viewer would initially see an empty table, which is gradually filled with information. If, on the other hand, the device has an additional receiving section, then the information about the other broadcasting authorities can be continuously updated, so that this information is available at any time when called up and there are no waiting times.

It can furthermore be provided that additionally transmitted information about the programme category is evaluated and the information to be displayed is sorted or selected on the basis of programme categories, and is displayed as a multi-page table, page by page successively, by repeatedly operating the call-up key.

This development allows the information about a large number of receivable programmes to be displayed more clearly and thus makes it easier for the listener or viewer to select deliberately the programme which interests him or her.

Finally, it is provided that an information text or operating instructions is or are displayed if there are no available or decodable additional information signals. This helps the listener or viewer to identify whether a control error has been made or there is a fault.

The invention will be explained in the following text, using two situation examples.

Example 1:

A television viewer switches his set on at 2330 hrs on Wednesday, Aug. 2, 1995 and selects the "ARD" broadcasting authority. A program, which operates in accordance with the method according to the invention, in a microcomputer within the set now uses additional information signals transmitted with the wanted signal to determine teletext pages which have time details immediately before and immediately after the current time. In this case, the time 2300 hrs is found to be linked with the programme title "Weh mir"[film], and the time 0020 hrs is found to be linked with the programme title "Tagesschau" [current affairs programme]. In addition, the program determines that there is also another teletext page relating to the programme title "Weh mir", which includes details about this film. This information is now stored internally.

If the television viewer wishes to know what the current programme is, then he or she operates a specific information key on the remote controller of his set, and the following information is overlaid on the screen:

<2300 hrs "Weh mir", film, remaining running time 50 minutes>.

If the television viewer operates the information key for a second time while the information is being displayed, then the programme description is overlaid. If the information key is operated once again, the start time and the title of the following programme are displayed, namely <0020 hrs "Tagesschau" [a current affairs programme]>.

The overlaid information disappears automatically after a preset time, which is normally sufficient for reading. If the information key is operated once the information has disappeared from the screen, then the first information is displayed again, and the remaining running time is in this case corrected.

The measure according to the invention makes it considerably easier to call up current information because the television viewer does not need to call up the pages, starting at page number 300, individually and at the same time wait for the waiting time which occurs with the serial data programme of the teletext pages.

Example 2:

The television viewer uses a set in which a modified program according to the invention controls a microcomputer in such a manner that the additional information signals of all the receivable broadcasting authorities are scanned in standby mode, and the information obtained therefrom is buffer-stored. If the device is switched on at the same time as in Example 1, and a table information key is operated, which displays the current information of all the receivable broadcasting authorities on the basis of programme categories in tabular form, then the "film" category is displayed, for example, when the key is first operated, with the following contents:

<ARD 2300 hrs "Weh mir" remaining running time 50 minutes>

<SAT 1 2300 hrs "Bridge to Hell" remaining running time 1 hour 10 minutes>

<PRO 7 2300 hrs "The Drifter" remaining running time 1 hour 10 minutes>

<RTL 2 2300 hrs "Die gelben Teufel von Los Angeles" [The yellow devil of Los Angeles] remaining running time 1 hour>.

When the table information key is operated a second time, all those programmes are displayed, for example, which are in the "series" category. The following display now appears:

<ZDF 2300 hrs "Derrick" remaining running time 30 minutes>.

If further key operations are made, programmes are then shown which fall into other programme categories, for example shows, sport, news, political magazines, scientific programmes and the like.

In this case, it is unimportant which current broadcasting authority is selected when the set is switched on. The current programme from any of the broadcasting authorities allows the television viewer to obtain the important information for a programme decision at a glance without having to switch through the individual broadcasting authorities step by step and searching through the teletext pages for programme information.

In a development of the invention, the data are not taken from a broadcasting authority but from a storage medium which can be supplied. This storage medium could be a CD-ROM, a diskette, an MOD or other storage carrier. It is thus possible to allow information to be called up from these storage media as well. The storage media are preferably also used as a type of TV magazine on a non-paper basis.

It is also possible to store the received data on a storage medium of the type mentioned above in order to make rapid or long-term access possible, or to archive or process the data.

We claim:

1. Method for calling up information about current radio and television programs wherein desired signals are transmitted together or separately with decodable additional information signals comprising the steps of:

selecting from the additional information signals that information which is directly or indirectly linked to time information;

comparing the selected information with a time period which can be predetermined and within which the current time and/or the time assigned to the current program occurs; and displaying on a display device of a receiving device which receives the desired signals and additional information signals the information corresponding to this time period, wherein a call up key of an associated receiving device or remote controller is provided and wherein depressing the call up key a first time causes display of start time, stop time, title and remaining run time on a portion of said display device in a first layer of display, and wherein, depressing the call up key a second time within a predetermined time interval after the first depressing of the call up key causes display of a program description to the present program in a second layer of display; and wherein depressing the call up key a third time within a predetermined time interval after the second depressing of the call up key causes display of start time and title of the following program in a third layer of display.

2. Method according to claim 1, wherein the time period which can be predetermined is bounded at least by that time information in the additional information signals which is adjacent to the current time and/or to the time which is assigned to a current programme.

3. Method according to claim 1, wherein the time period which can be predetermined is bounded on the one hand by that time information in the additional information signals which occurs immediately before the current time or by the time which is assigned to a current programme, and on the other hand by that time information in the additional information signals which occur after the current time.

4. Method according to claim 1, wherein the time period which can be predetermined is bounded on the one hand by that time information in the additional information signals which occurs immediately before the current time or by the time which is assigned to a current programme, and on the other hand by a fixed time interval after the current time.

5. Method according to claim 1, wherein at least the start time, the title of the programme and the remaining running time are displayed in response to depressing the call up key a first time.

6. Method according to claim 5, wherein a programme description relating to the present programme is displayed in response to depressing the call up key a second time within a predetermined time interval after the first operation of the call up key.

7. Method according to claim 6, wherein at least the start time and the title of the following programme are displayed in response to depressing the call up key a third time within a predetermined time interval after the second operation of the call up key.

8. Method according to claim 1, wherein the additional information signals of all the receivable or programmed broadcasting authorities are called up successively and are displayed as a table by further operation of the same call up key one or more times.

9. Method according to claim 8, wherein additionally transmitted information about the programme category is evaluated and the information to be displayed is sorted or selected on the basis of programme categories, and is displayed as a multi-page table, page by page successively, by repeatedly operating the call-up key.

10. Method according to claim 1, wherein an information text or operating instructions is or are displayed if there are no available or decodable additional information signals.

11. Method according to claim 8, characterized in that the additional information signals of all receivable or programmed broadcasting authorities are called up successively and are displayed as a table by further operation of a further call up key on the display device one or more times.

12. Method for calling up information about current radio and television programs wherein desired signals are transmitted together or separately with decodable additional information signals comprising the steps of:

selecting from the additional information signals that information which is directly or indirectly linked to time information;

comparing the selected information with a time period which can be predetermined and within which the current time and/or the time assigned to the current program occurs; and displaying on a display device of a receiving device which receives the desired signals and additional information signals the information corresponding to this time period, wherein a call up key of an associated receiving device or remote controller is provided, wherein depressing the call up key a first time causes display of all receivable broadcasting authorities which have been scanned in a standby mode and are buffer-stored for display in a tabular form in a first layer of display, depressing the call up key a second time within a predetermined time interval after the first depressing of the call up key causes display of all programs for a special category in a second layer of display; and depressing the call up key a third time within a predetermined time interval after the second depressing of the call up key causes display of all programs which fall into other than the special category in a third layer of display.

* * * * *